United States Patent
Benami et al.

(10) Patent No.: US 10,699,729 B1
(45) Date of Patent: Jun. 30, 2020

(54) PHASE INVERSION FOR VIRTUAL ASSISTANTS AND MOBILE MUSIC APPS

(71) Applicant: Amazon Technologies, Inc., Seattle, WA (US)

(72) Inventors: Daniel Chay Benami, San Francisco, CA (US); Kevin Moran, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 22 days.

(21) Appl. No.: 16/004,183

(22) Filed: Jun. 8, 2018

(51) Int. Cl.
*G10L 15/00* (2013.01)
*G10L 25/81* (2013.01)
*G10L 15/22* (2006.01)
*G10L 25/27* (2013.01)
*G10L 15/08* (2006.01)

(52) U.S. Cl.
CPC .............. *G10L 25/81* (2013.01); *G10L 15/08* (2013.01); *G10L 15/22* (2013.01); *G10L 25/27* (2013.01); *G10L 2015/088* (2013.01)

(58) Field of Classification Search
CPC .................................................... G10L 15/00
USPC ....... 704/233, 500, 220, 201, 205, 212, 213; 702/189, 187; 381/61, 17, 12, 119
See application file for complete search history.

(56) References Cited

U.S. PATENT DOCUMENTS

| | | | | |
|---|---|---|---|---|
| 3,971,922 A | * | 7/1976 | Bellanger | H03H 17/0273 708/316 |
| 4,691,358 A | * | 9/1987 | Bradford | H04S 7/40 324/121 R |
| 5,274,606 A | * | 12/1993 | Drumheller | E21B 47/16 340/854.4 |
| 5,659,660 A | * | 8/1997 | Plenge | H04B 1/62 704/201 |
| 6,363,155 B1 | * | 3/2002 | Horbach | H04S 7/302 381/17 |
| 7,027,054 B1 | * | 4/2006 | Cheiky | G06T 13/40 345/473 |
| 7,107,188 B2 | * | 9/2006 | Veneruso | G01V 1/36 702/187 |
| 7,184,937 B1 | * | 2/2007 | Su | G01R 23/02 324/536 |
| 8,428,271 B1 | * | 4/2013 | Luke | H03G 7/004 381/118 |

(Continued)

*Primary Examiner* — Michael Colucci
(74) *Attorney, Agent, or Firm* — Kilpatrick Townsend & Stockton LLP

(57) ABSTRACT

Techniques for identifying a wake word by a device that is also playing audio content at the same time are described herein. For example, a device may execute playback of an audio file with a corresponding first variable wave form. The device may receive a second variable wave form that includes the first variable wave form and additional audio. In embodiments, a latency value may be identified based on comparing amplitudes and frequencies of portions of the first variable wave form and the second variable wave form. The second variable wave form may be modified by applying the latency value and inverting the second variable wave form with respect to the first variable wave form. The modified variable wave form may be merged with the first variable wave form to generate a merged variable wave form. A particular audio signal may be identified in the merged variable wave form.

18 Claims, 8 Drawing Sheets

(56) References Cited

U.S. PATENT DOCUMENTS

| | | | | |
|---|---|---|---|---|
| 2005/0271214 | A1* | 12/2005 | Kim | H04S 1/002 |
| | | | | 381/17 |
| 2008/0120665 | A1* | 5/2008 | Relyea | H04N 21/4147 |
| | | | | 725/110 |
| 2014/0043177 | A1* | 2/2014 | Pagnanelli | H03M 3/30 |
| | | | | 341/143 |
| 2014/0378191 | A1* | 12/2014 | Hosoi | H04M 1/05 |
| | | | | 455/575.1 |
| 2015/0171890 | A1* | 6/2015 | Pagnanelli | H03M 3/468 |
| | | | | 341/143 |
| 2015/0248889 | A1* | 9/2015 | Dickins | G10L 19/008 |
| | | | | 704/500 |
| 2015/0325226 | A1* | 11/2015 | Rosedale | G10H 5/02 |
| | | | | 381/119 |
| 2018/0082172 | A1* | 3/2018 | Patel | G06N 3/08 |

* cited by examiner

PHASE INVERSION FOR VIRTUAL ASSISTANTS AND MOBILE MUSIC APPS

BACKGROUND

With the advancement of technology, the use and popularity of electronic devices has increased considerably. Electronic devices are commonly used to capture, process, and transmit image and audio data. Some electronic devices utilize voice recognition technology which can be utilized to obtain and a user's voice commands and execute actions that correspond to the voice commands. Electronic devices may utilize software that analyzes incoming audio to detect wake words which cause a system to initiate the obtaining and executing of voice commands provided by a user. For example, a user may say "Jarvis, reduce the temperature in the room by five degrees." Some electronic devices may include functionality for both playing or transmitting content such as audio content as well as receiving or obtaining user input in the form of voice commands. However, such devices may utilize hardware configurations that place an output component (e.g., a speaker) within close proximity to an input component (e.g., a microphone). Such hardware configurations can result in voice commands or wake words being undetected by the device as the wake words or voice commands are drowned out by other sounds or otherwise undetectable by the device and software. For example, an electronic device playing loud music, which the microphone picks up, may make it difficult for the system to detect the utterance of a wake word provided by a user. There remains a need for improved voice-controlled devices.

BRIEF DESCRIPTION OF THE DRAWINGS

Various embodiments in accordance with the present disclosure will be described with reference to the drawings, in which.

DETAILED DESCRIPTION

Figure 1:
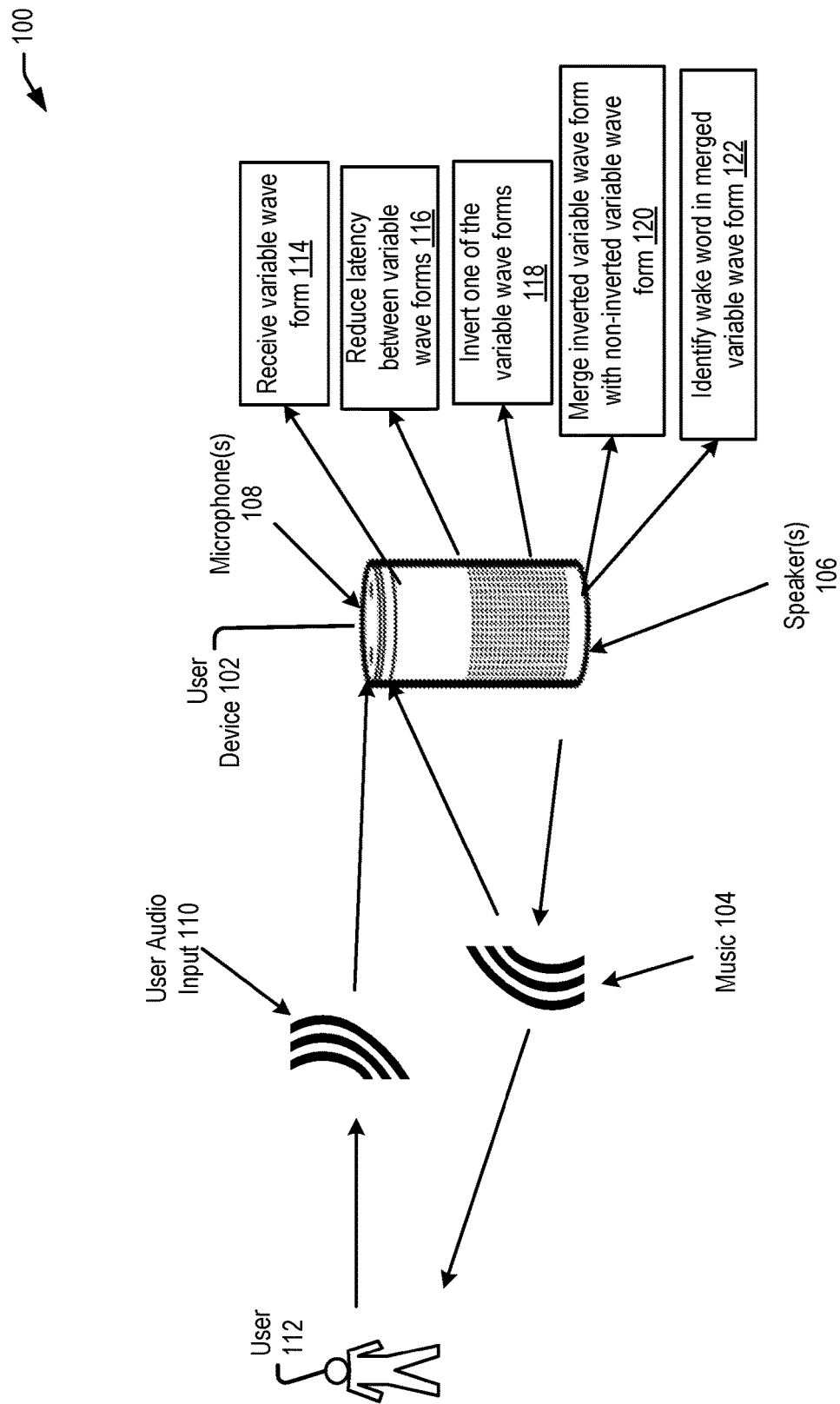
FIG. 1 illustrates an example workflow for a phase inversion feature in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide for a phase inversion feature for identifying a wake word or other voice command provided by a user in a stream of audio data that includes other sounds. For example, a device may be configured to utilize output components (e.g., speakers) to transmit or playback content such as music or streaming content. The same device may also be configured to utilize input components (e.g., microphones) to receive and/or capture (e.g., record) sounds within a certain distance of the device such as the same content and voice commands or wake words provided by a user. In embodiments, the phase inversion feature may utilize a first variable wave form which corresponds to the content being transmitted or played and a second variable wave form that is captured or recorded by the input components, which includes the first variable wave form and additional audio to more easily identify wake words or voice commands provided by a user. For example, a user's electronic device may be playing music from an MP3 file using a speaker while also recording the music and other sounds using an associated microphone. In embodiments, a wake word may include a mono or multi-syllabic word or phrase that devices and applications listen for in order to prompt the devices or applications to taken an action. The wake word may include a word or phrase that in itself includes the action for the device or application to execute.

A user may attempt to provide a wake word, which an electronic device (e.g., a user device) can interpret while music is playing on the electronic device. The phase inversion feature implemented by an application of the electronic device may modify the received sounds (e.g., the second variable wave form noted above) by reducing latency between the second variable wave form and the first variable wave form which corresponds to the MP3 file. Once latency has been reduced between the variable wave forms, the modified second variable wave form may be inverted by multiplying the phase by a negative value (e.g., −1) to invert the associated wave form by inverting the corresponding amplitude of the wave form. The variable wave forms may then be merged which results in a reduced music wave form where the additional audio provided by a user is more easily identified by the application and system as it is not reduced or otherwise affected by the phase inversion of the variable wave forms. In other words, the MP3 file has no similar wave form or audio signal that, when inverted and combined, would reduce the voice command or wake word audio signal included in the second variable wave form. In accordance with at least one embodiment, further modification may be applied to either the first variable wave form, the second variable wave form, or both variable wave forms according to whether the variable wave forms correspond to monoaural sound (mono) or stereophonic sound (stereo). For example, a first variable wave form which corresponds to an MP3 may be recorded in stereo while the second variable wave form captured by a microphone of a user device may be configured to capture audio in mono. In embodiments, the phase inversion feature may modify one variable wave form from stereo to mono or from mono to stereo to provide a more accurate phase inversion when the modified variable wave forms are merged. In embodiments, a user device may be configured to obtain or record sounds in stereo using one or more microphones. In some embodiments, audio files may be maintained in mono format such that obtained mono variable wave forms can be merged with the mono audio file to obtain more accurate phase inversion. In accordance with at least one embodiment, the first variable wave form or the second variable wave form may be modified by changing the sampling rate of the audio (e.g., 16 kHz to 44.1 kHz or vice versa), the file format of an associated audio file, a sound resolution of the wave form or audio file, or a byte order of the wave form or audio file. For example, an audio file that corresponds to an original file may need to be down sampled to be more similar to the audio generated or captured by a microphone of a user device.

In accordance with at least one embodiment, the variable wave forms which correspond to the audio obtained or captured by the input components of an electronic device can be inverted and merged with a source audio file to generate a merged variable wave form that includes reduced audio for sounds included in the source audio file while maintaining the volume and therefore detectability of wake words, voice commands, or other audio provided by a user to the electronic device. In embodiments, the phase inversion features provide for reducing latency between the source audio file and the received audio sounds or corresponding variable wave forms such that the subsequent phase inversion will be more effective at reducing the noise or volume of sounds that are not provided by a user. In embodiments, a filter may be applied to the merged variable wave form to reduce noises that are not associated with a user's voice and correspond to voice commands or a wake word. For example, a frequency may be applied that removes frequencies below a certain frequency such as 450 hz. The removal of certain frequencies may make the identification of the wake word easier to detect by the system in the merged variable wave form.

Reducing latency may involve utilizing an algorithm that attempts to align the peaks and valleys between the variable wave forms (source audio and received audio) as well as introducing a time period shift to one of the variable wave forms such that the wave forms more properly align. In some embodiments, the phase inversion feature may utilize a calibration feature for determining a latency value that can further be used to generate a time period to shift received audio and reduce latency between the received audio and a source audio file. In embodiments, the phase inversion feature may utilize one or more thresholds for different types of content that can be used to compare latency values or determinations between variable wave forms. For example, if a determined latency value exceeds a threshold further latency reduction may need to be performed before subsequent phase inversion can be utilized to maximize noise reduction between the variable waves. In embodiments, once a wake word or voice command has been identified, the device may be configured to respond to the voice command or wake word by reducing the volume of played or transmitted content, stop playback of the content, or perform other actions which correspond to the voice command or wake word. In embodiments a wake word may be identified by comparing a particular audio signal or wave form to a library of audio signals or wave forms that correspond to recognized wake words or voice commands. The wake words or voice commands may be recognized by a system and the phase inversion feature such that the user may provide audio (e.g., singing along to a song) without initiating an action by the system or device implementing the phase inversion feature.

The processes and systems described herein may be an improvement on conventional voice recognition systems. For example, conventional devices that implement voice recognition systems (e.g., systems that can identify and respond to wake words and voice commands) may have problems detecting wake words when they utilize hardware configurations that place a speaker in close proximity to a microphone and the speaker is also transmitting audio content. Such conventional systems may record or obtain audio provided by the speaker with their microphone at such an increased volume that any additional audio provided by a user (e.g., a wake word) may not be detected or easily detected by an associated system or application. For example, a user may have to move closer to the device, speak louder, or manually reduce the volume of the content before the system can identify that a wake word or voice command is being provided. The techniques described herein provide for more efficient identification of wake words when similar hardware configurations are utilized and when devices are also playing or transmitting content such that a user can provide their input at a normal volume and without being at a certain distance from the device. The phase inversion features described herein may merge variable wave forms that have been phase inverted to reduce the volume or noise of the content being played by the device such that additional audio provided by a user may be more easily detected and analyzed to determine whether a wake word or voice command has been provided. Further, the phase inversion features described herein can identify wake words while content is being played by the same device that is listening for wake words in near real-time such that the system can respond to the user's commands without introducing a long delay between utterance of the wake word and response by the system.

FIG. 1 illustrates an example workflow for a phase inversion feature in accordance with at least one embodiment. In workflow 100, a user device 102 (e.g., media device, electronic device, computer device, mobile device, etc.,) may transmit or play content such as music 104 using associated speakers 106. The user device 102 may include microphones 108 that are configured to obtain or record sounds within a certain distance of the user device 102 including the music 104 and user audio input 110 provided by user 112. In the illustrated workflow 100, the user 112 may be enjoying music 104 played by the user device 102 using speakers 106. At some time during the playing of the music 104 the user 112 may wish to provide a wake word to the user device 102 to execute some subsequent command. For example, the user audio input 110 may include the wake word. The phase inversion features described herein may be utilized to identify the wake word included in the user audio input 110 despite the user device 102 also recording or being inundated by the music 104.

In accordance with at least one embodiment, the microphones 108 of user device 102 may receive, obtain, or record the music 104 and the user audio input 110. In embodiments, an application of the user device implementing the phase inversion features described herein may receive the variable wave form which corresponds to the music 104 plus the user audio input 110 at 114. In embodiments, a variable wave form may be maintained or accessed by the user device 102 that corresponds to an origination audio file for the music 104 or other content. The origination audio file for the music 104 can be utilized in the phase inversion process to reduce the noise or volume of the received variable wave form 114 as described herein. In accordance with at least one embodiment, the phase inversion features described herein and implemented by the user device 102 or service provider computers (not pictured) may identify quality levels of the received variable wave form 114 for comparison to a quality level of a maintained audio file or a received streaming audio file. For example, a large difference in quality levels between the variable wave forms can affect the phase inversion and merging of the variable wave forms. To further illustrate, difference between sample rates of the variable wave forms may need to be reduced in order to increase the effectiveness of the phase inversion when the variable wave forms are merged according to the described phase inversion features. In embodiments, sample rates or audio channels may be modified to reduce the sound quality difference between audio files or variable wave forms to increase the effectiveness of the phase inversion. The application may reduce latency between the variable wave forms at 116 by utilizing an algorithm to identify minimal distances between peaks and valleys of the wave forms using the amplitudes and frequencies of the wave forms from the received variable wave form and the maintained variable wave form for music 104. The phase inversion feature may be configured to invert one of the variable wave forms at 118. For example, the application implementing the phase inversion feature may multiply one of the variable wave forms by a negative value such that the wave form includes an identical frequency of the other wave form but opposite amplitude or an inverse polarity as described in more detail with reference to FIG. 4 below.

In accordance with at least one embodiment, the workflow 100 includes the user device 102 and associated application implementing the phase inversion feature merging the inverted or modified variable wave form with the non-inverted variable wave form at 120. In embodiments, the merging of the non-inverted variable wave form and the variable wave form may generate a merged variable wave form that reduces the volume, noise included in the merged variable wave from as combining the opposite polarity wave forms results in a reduction of the music 104 except where the user audio input 110 is present as no polar opposite wave exists in the audio origination file. The resultant audio signal or particular wave(s) that correspond to the user audio input 110 may be more easily identifiable by a system as all other audio wave forms in the merged variable wave form are reduced due to the phase inversion that results from combining wave forms of opposite polarities. In accordance with at least one embodiment, the workflow 100 includes identifying the wake word in the merged variable wave form 122. In embodiments, the application may reduce the volume of the music 104 in response to identifying the wake word at 122 or cease playback or transmittal of the music 104 all together in response to identifying the wake word at 122. The system may reduce the music 104 or stop playing the music 104 to prepare for or otherwise initiate the application for identifying further commands from the user 112 and executing actions that correspond to the commands. In some embodiments, if the user audio input 110 includes a voice command or consists solely of a voice command from user 112, the user device 102 may generate and execute instructions for executing the command that corresponds to the user audio input 110.

Figure 2:
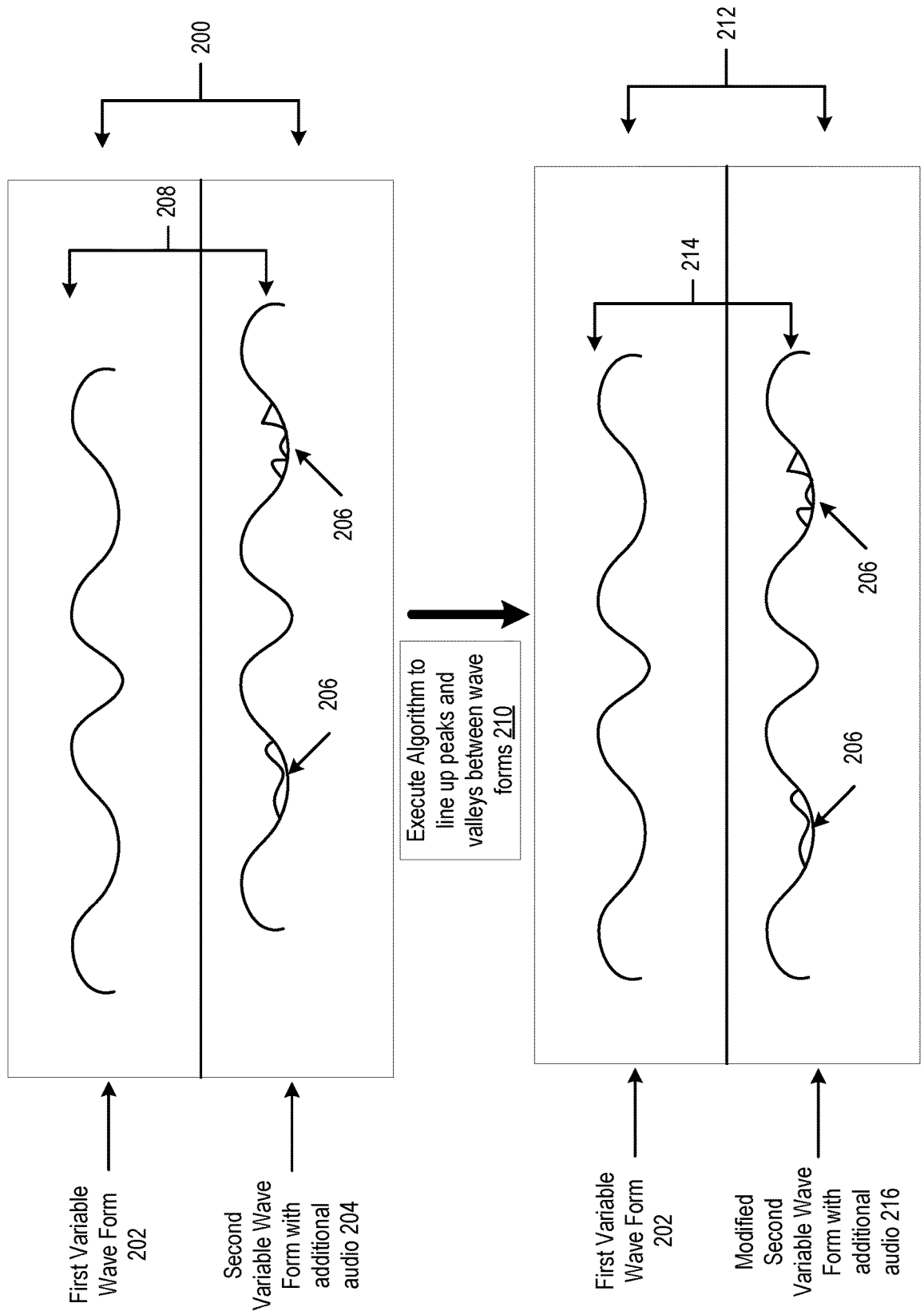
FIG. 2 illustrates an example process for reducing latency between variable wave forms for a phase inversion feature in accordance with at least one embodiment.

FIG. 2 illustrates an example process for reducing latency between variable wave forms for a phase inversion feature in accordance with at least one embodiment. FIG. 2 includes at 200 a first variable wave form 202 that corresponds to an audio file for content such as an MP3 file or a wave file for a piece of content. In embodiments, the application of a user device or electronic device implementing the phase inversion features described herein may access, download, or otherwise obtain the audio file for the content that is being transmitted or played by the device and obtain the corresponding variable wave form (e.g., first variable wave form 202). FIG. 2 also depicts a second variable wave form with additional audio at 204. The additional audio 206 in the second variable wave form 204 may correspond to audio input provided by a user to an electronic device such as input that corresponds to a voice command or wake word for the device to initiate execution of voice recognition commands. As illustrated in FIG. 2, the first variable wave form 202 and second variable wave form with additional audio 204 are not aligned to reflect a latency 208 between the audio file being played (the first variable wave form 202) by the device and the wave form received that is derived from the audio file (second variable wave form with additional audio 204).

In accordance with at least one embodiment, the phase inversion feature may include executing an algorithm to reduce latency 208 between the variable wave forms 202 and 204 at 210 by lining up the peaks and valleys between the wave forms 202 and 204. For example, the algorithm may be configured to utilize optical recognition techniques to identify dissimilarities between the peaks and valleys of the variable wave forms 202 and 204 and attempt to shift one of the variable wave forms to align the peaks and values thereby reducing the latency between the audio files. 212 of FIG. 2 depicts the execution of the algorithm to reduce latency at 210 thereby reducing the latency 208 to a minimal distance between the peaks and valleys 214 between the first variable wave form 202 and the modified second variable wave form with additional audio 216. As described herein, by reducing the latency 214 between the variable wave forms 202 and 216 a subsequent inversion of either variable wave form 202 and 216 will result in a more accurate phase inversion when the variable wave forms 202 and 216 are merged. Compared to attempting to invert second variable wave form 204 and merge with first variable wave form 202 with the latency 208 not corrected, the resultant merged variable wave form would not result in an overall reduced noise or volume of the audio thereby making it more difficult or impossible for the system or application to identify the additional audio 206. Instead, as discussed with reference to FIG. 4, the resulting inversion and merging of first variable wave form 202 and modified second variable wave form with additional audio 216 with the latency removed 214 will generate a merged variable wave form that reduces the audio of the content while maintaining the additional audio provided by a user 206.

Figure 3:
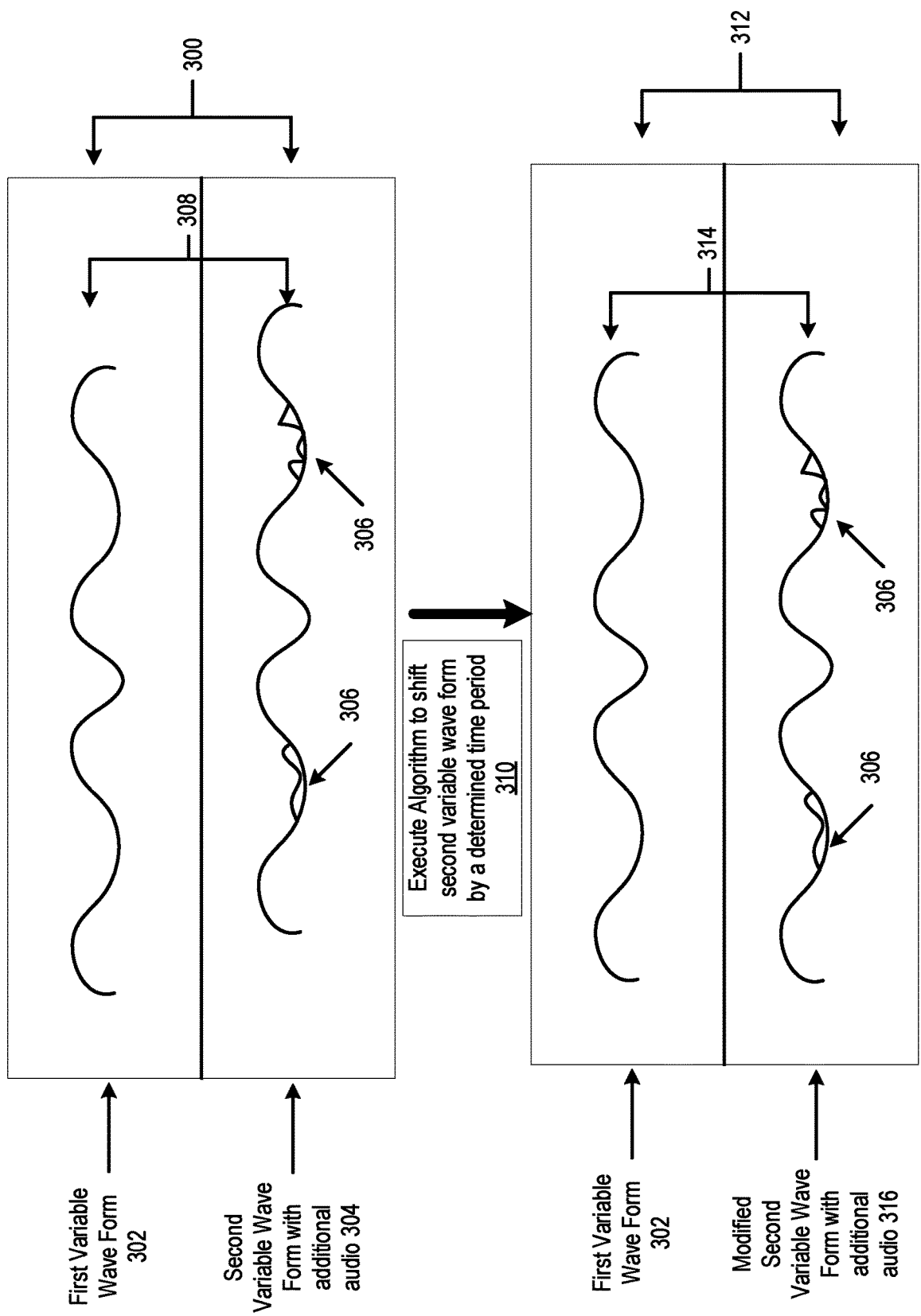
FIG. 3 illustrates an example process for reducing latency between variable wave forms for a phase inversion feature in accordance with at least one embodiment.

FIG. 3 illustrates an example process for reducing latency between variable wave forms for a phase inversion feature in accordance with at least one embodiment. FIG. 3 includes at 300 a first variable wave form 302 that corresponds to an audio file for content such as an MP3 file or a wave file for a piece of content. In embodiments, the application of a user device or electronic device implementing the phase inversion features described herein may access, download, or otherwise obtain the audio file for the content that is being transmitted or played by the device and obtain the corresponding variable wave form (e.g., first variable wave form 302). FIG. 3 also depicts a second variable wave form with additional audio at 304. The additional audio 306 in the second variable wave form 304 may correspond to audio input provided by a user to an electronic device such as input that corresponds to a voice command or wake word for the device to initiate execution of voice recognition commands. As illustrated in FIG. 3, the first variable wave form 302 and second variable wave form with additional audio 304 are not aligned to reflect a latency 308 between the audio file being played (the first variable wave form 302) by the device and the wave form received that is derived from the audio file (second variable wave form with additional audio 304).

In accordance with at least one embodiment, the phase inversion feature may include executing an algorithm to reduce latency 308 between the variable wave forms 302 and 304 at 310 by executing an algorithm to shift the second variable wave form by determined time period. For example, the algorithm may configured to utilize differences in timing between similar portions of audio between the first variable wave form 302 and second variable wave form with additional audio 304 to determine a time period or latency value that represents the latency between the audio file that corresponds to the content being played by the device and the audio being captured by the device for the content. For example, if a time delay of 0.02 seconds is identified by comparing the wave forms 302 and 304 is identified by the algorithm, the phase inversion feature may shift the second variable wave form with additional audio 304 by 0.02 seconds to reduce the latency between the files. In accordance with at least one embodiment, the phase inversion features may include utilizing a test or calibration audio file, periodically, to identify a latency value that represents the latency between the transmitted and received content for an audio file. The latency value can be used to determine a time period to automatically shift all obtained or recorded audio (e.g., second variable wave form with additional audio 304) to more efficiently reduce the latency between the variable wave forms 302 and 304 prior to inverting one of the variable wave forms. In some embodiments, the phase inversion features may include continually calibrating to determining the latency value between the first variable wave form 302 and any received, recorded, or obtained audio by a corresponding device such that when additional audio 306 is provided by a user the system can more efficiently apply the determined latency value and shift the second variable wave form with additional audio 304 prior to inverting the wave form 304.

Execution of the algorithm to reduce latency at 310 is depicted at 312 of FIG. 3 thereby reducing the latency 308 to a minimal distance between the peaks and valleys 314 between the first variable wave form 302 and the modified second variable wave form with additional audio 316. As described herein, by reducing the latency 314 between the variable wave forms 302 and 316 a subsequent inversion of either variable wave form 302 and 316 will result in a more accurate phase inversion when the variable wave forms 302 and 316 are merged. Compared to attempting to invert second variable wave form 304 and merge with first variable wave form 302 with the latency 308 not corrected, the resultant merged variable wave form would not result in an overall reduced noise or volume of the audio thereby making it more difficult or impossible for the system or application to identify the additional audio 306. Instead, as discussed with reference to FIG. 4, the resulting inversion and merging of first variable wave form 302 and modified second variable wave form with additional audio 316 with the latency removed 314 will generate a merged variable wave form that reduces the audio of the content while maintaining the additional audio provided by a user 306.

Figure 4:
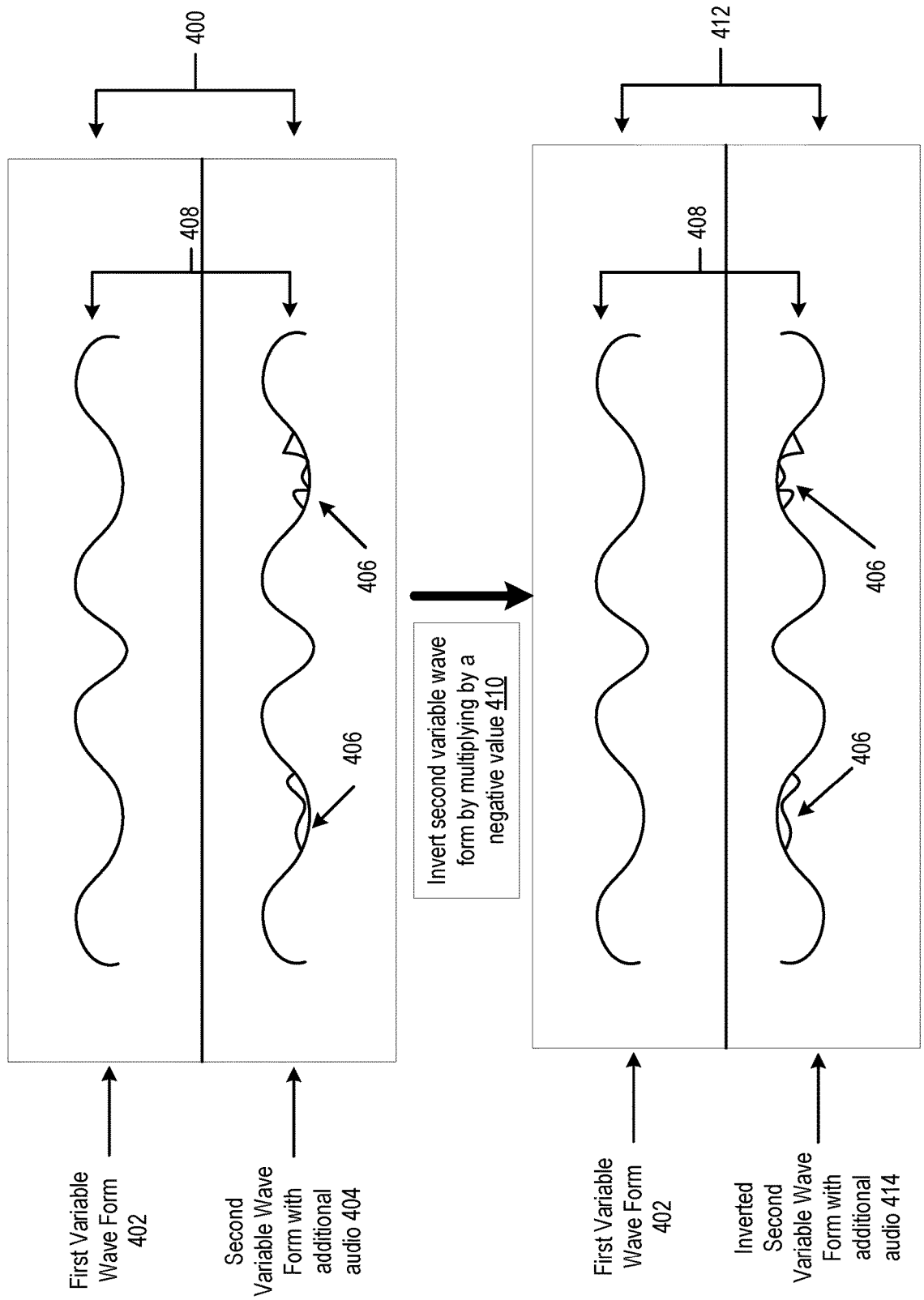
FIG. 4 illustrates an example process for inverting a variable wave form for a phase inversion feature in accordance with at least one embodiment.

FIG. 4 illustrates an example process for inverting a variable wave form for a phase inversion feature in accordance with at least one embodiment. FIG. 4 includes at 400 first variable wave form 402 that corresponds to an audio file for content such as movie or other streaming content. FIG. 4 also depicts a second variable wave form with additional audio at 404. The additional audio 406 in the second variable wave form 404 may correspond to audio input provided by a user to an electronic device such as input that corresponds to a voice command or wake word for the device to initiate execution of voice recognition commands. At 400 of FIG. 4, the variable wave forms 402 and 404 are aligned 408 to represent that latency has been reduced between the wave forms 402 and 404 using a latency reduction process described above with respect to FIGS. 2 and 3. As described herein, the phase inversion feature includes inverting one of the variable wave forms 402 or 404 by multiplying it by a negative value such as negative 1 to maintain the frequencies but invert the amplitude of the modified wave form at 412.

The inversion of one of the variable wave forms 402 or 404 will enable the merging of the two wave forms to phase invert thereby reducing the volume or noise of the audio file being played by the device representing the first variable wave form 402 and the portion of the second variable wave form 404 except for the additional audio 406. 412 of FIG. 4 depicts the inverted second variable wave form with additional audio at 414 compared to the first variable wave form 402. As illustrated, when the two wave forms 402 and 414 are combined phase inversion occurs which results in the sound or noise of wave forms of opposite polarity to reduce the resultant sound from said wave forms. However, as the additional audio portions 406 do not have a respective opposite polarity the resultant noise or sound is unaffected and thereby more easily detected by a system attempting to identify a wake word or voice commanded provided by a user.

Figure 5:
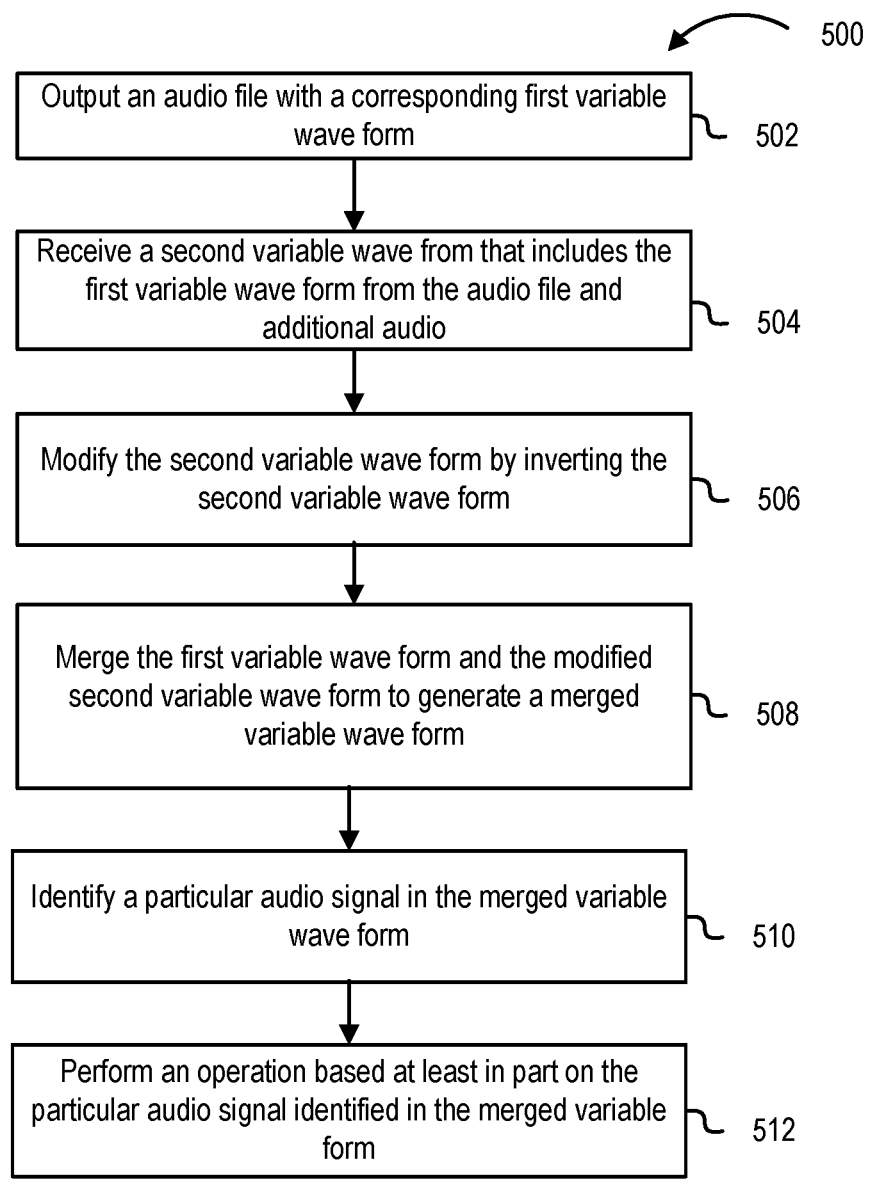
FIG. 5 illustrates a flow diagram of a process for a phase inversion feature in accordance with at least one embodiment.
Figure 6:
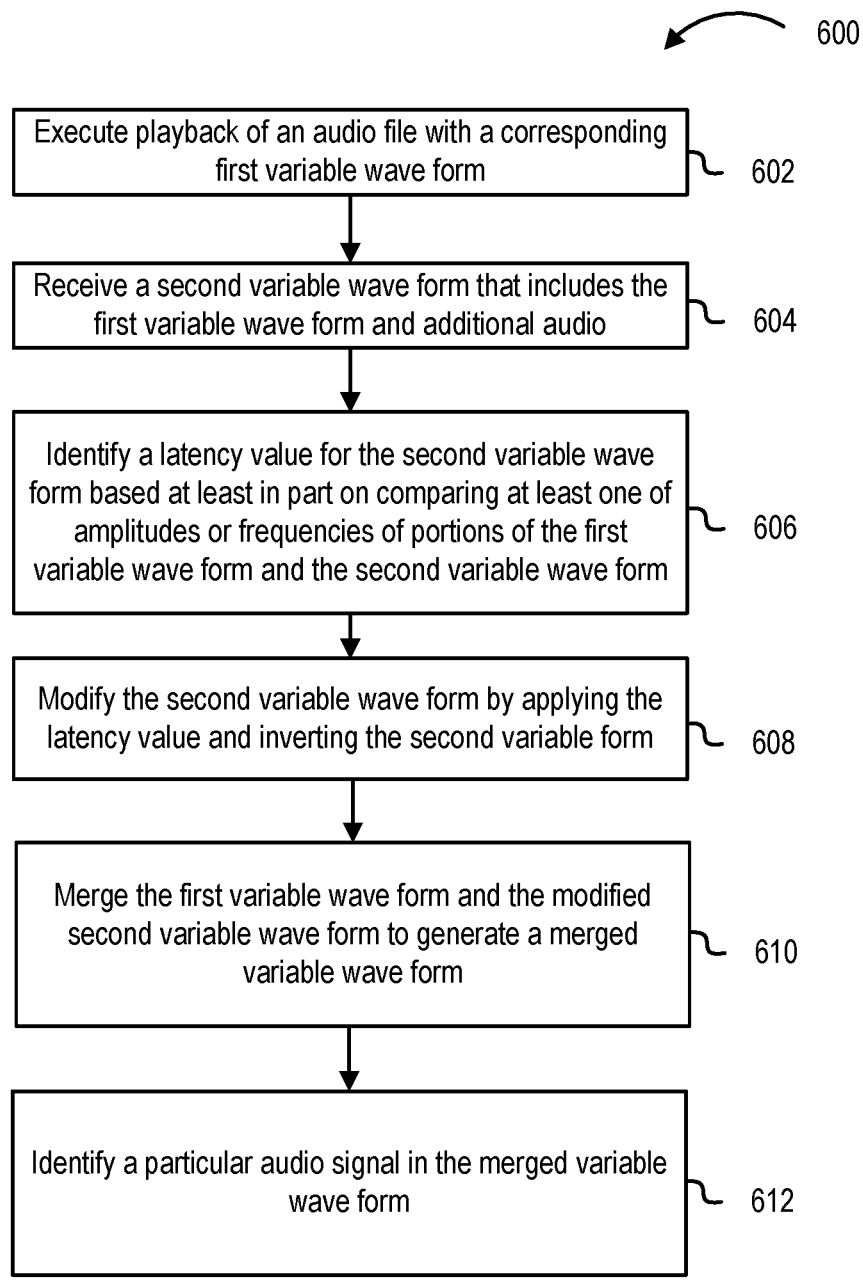
FIG. 6 illustrates a flow diagram of a process for a phase inversion feature in accordance with at least one embodiment.

FIGS. 5 and 6 illustrate example flow charts for phase inversion features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process (or any other processes described herein, or variations and/or combination thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

Figure 7:
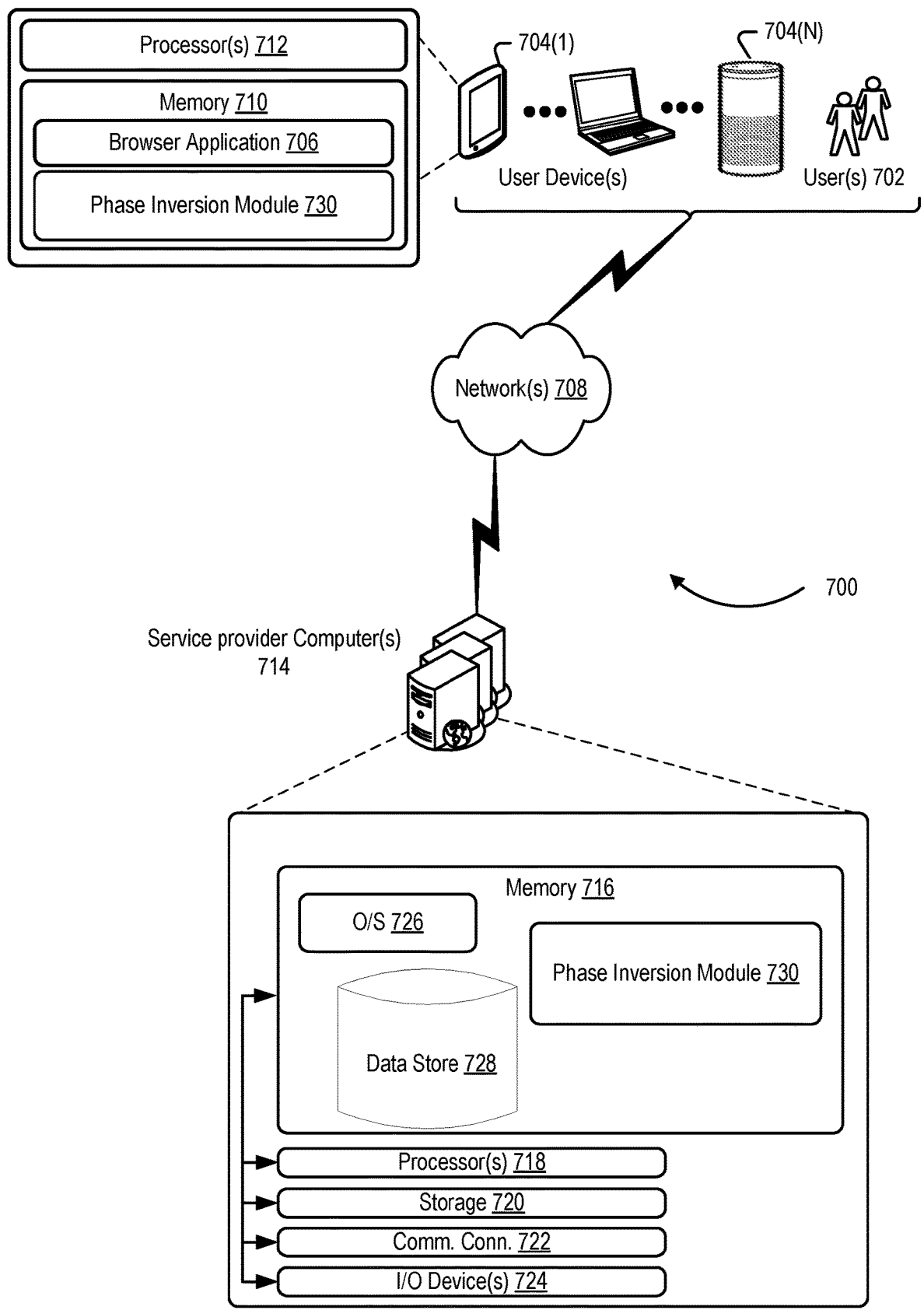
FIG. 7 illustrates an example architecture for implementing a phase inversion feature as described herein that includes a user device and one or more service provider computers which may be connected via one or more networks in accordance with at least one embodiment.

In some examples, the user device (102, 704) or service provider computers (service provider computers 714) utilizing at least the phase inversion module 730 depicted in FIGS. 1 and 7 may perform the processes 500 and 600 of FIGS. 5 and 6. In FIG. 5, the process 500 may include outputting an audio file with a corresponding first variable wave form at 502. For example, a user device may utilize associated speakers to play music by accessing an obtained MP3 file. The process 500 may include receiving a second variable wave form that includes the first variable wave form from the audio file and additional audio at 504. In embodiments, the user device may be configured to utilize one or more microphones to obtain or record sound within a certain distance of the user device. A user who is listening to music played by the user device may attempt to interact with the device via voice recognition and a wake word. In embodiments, the additional audio may include the input provided by the user in an attempt to convey a wake word or the wake word or voice command may be transmitted by another device. The process 500 may include modifying the second variable wave form by inverting the second variable wave form at 506. In embodiments, the application implementing the phase inversion feature may multiple the second variable wave form by a negative value such as −1.

The process 500 may include merging the first variable wave form and the modified second variable wave form to generate a merged variable wave form at 508. In embodiments, because the second variable wave form has been inverted the merged variable wave form includes a phase inverted wave form between the first variable wave form and the second variable wave form which results in the corresponding sounds (e.g., polar opposite amplitudes) from canceling each other out to reduce the sound or noise from said amplitudes. As described herein, the additional audio which may correspond to the user's wake word audio signals however would not be reduced as the merged wave form has no polar opposite with which to cancel or reduce the noise of the additional audio. The process 500 may include identifying a particular audio signal in the merged variable wave form at 510. In accordance with at least one embodiment, the phase inversion feature may compare the particular audio signal to a library of audio signals maintained by the user device or received from a server to identify a corresponding voice command, action, or task. For example, the particular audio signal may be compared to a library of audio signals which each correspond to a particular task and associated instructions which the application and/or device execute upon identifying the voice command or wake word included in the particular audio signal.

The process 600 may include executing playback of an audio file with a corresponding first variable wave form at 602. The process 600 may include receiving a second variable wave form that includes the first variable wave from and additional audio at 604. The process 600 may include identifying a latency value for the second variable wave form based at least in part on comparing at least one of amplitudes or frequencies of portions of the first variable wave form and the second variable wave form at 606. The process 600 may include modifying the second variable wave form by applying the latency value and inverting the second variable wave form at 608. In embodiments, the phase inversion feature may utilize a calibration operation with a given user device to identify a given latency value that corresponds to a time period that represents the latency between an amplitude and frequency of an audio file played by the user device and the resultant audio file recorded by the same device.

In such cases where a calibration operation is utilized, the phase inversion feature may apply the determined latency value to all incoming audio (e.g., recorded or obtained audio of the user device). By applying the latency value to align the two variable wave forms as approximately close as possible an improved phase inversion may be obtained when one of the variable wave forms is inverted and then merged with the other variable wave form. In embodiments, the phase inversion feature may maintain one or more threshold values which are associated with different types of content (e.g., music, streaming content, movies, etc.,). The phase inversion feature may determine whether the latency between the two variable wave forms is below a certain value before performing an inversion operation to one of the variable wave forms. Continual latency reduction between the two variable wave forms may be executed until the latency value falls below one of the maintained thresholds. The process 600 may include merging the first variable wave form and the modified second variable wave form to generate a merged variable wave form at 610. The process 600 may include identifying a particular audio signal in the merged variable wave form at 612.

FIG. 7 illustrates an example architecture for implementing a phase inversion feature as described herein that includes a user device and one or more service provider computers which may be connected via one or more networks in accordance with at least one embodiment. In architecture 700, one or more users 702 (e.g., customers, users, consumers, etc.,) may utilize user computing devices 704(1)-(N) (collectively, user devices 704) to access content such as streaming content via voice commands, gestures, or input provided via an interface such as a browser application 706 or a user interface (UI) accessible through the browser application 706, via one or more networks 708 to request content including media content such as movies, films, TV shows, pod casts, or streaming content. In embodiments, the one or more users 702 may utilize user computing devices 704(1)-(N) to access the browser application 706 or a UI accessible through the browser application 706, to request content such as streaming audio via one or more networks 708 included media content from a third party computer (not pictured) or from service provider computers 714. The "browser application" 706 can be any browser control or native application that can access and display a network page or other information such as a user interface of a native software application for enabling the selection or interaction of content. A native software application may include an application or program that has been developed for use on a particular platform (such as an operating system) or a particular device (such as a particular type of mobile device or user device 704). In embodiments, the user device 704 may include one or more components for enabling the user 702 to interact with the browser application 706. In accordance with at least one embodiment, the user device 704 may include one or more components for enabling the user 702 to provide voice commands, wake words, gestures, or other forms of input such as audio input which cause the user device 704 or interconnected devices (e.g., smart thermostats, door locks, etc.,) (not pictured) execute an action that corresponds to the voice command or wake word. It should be noted that although FIGS. 1-4 and 7 describe a user interacting with a user device for utilizing the phase inversion features described herein, in embodiments the user device 704 may obtain and transmit input such as variable wave forms to the service provider computers 714 to perform similar functionality as that of the user device 704 by using at least the phase inversion module 730.

The user devices 704 may include at least one memory 710 and one or more processing units or processor(s) 712. The memory 710 may store program instructions that are loadable and executable on the processor(s) 712, as well as data generated during the execution of these programs. Depending on the configuration and type of the user devices 704, the memory 710 may be volatile (such as random access memory (RAM)) and/or non-volatile (such as read-only memory (ROM), flash memory, etc.). The user devices 704 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 704. In some implementations, the memory 710 may include multiple different types of memory, such as static random access memory (SRAM), dynamic random access memory (DRAM), or ROM.

Turning to the contents of the memory 710 in more detail, the memory 710 may include an operating system and one or more application programs or services for implementing the features disclosed herein. Additionally, the memory 710 may include one or more modules for implementing the features described herein including the phase inversion module 730. The user device 704 may include one or more output components such as speakers, an LED screen, a user interface and input components such as microphones, LED readers, light transmitters/receivers, etc. In accordance with at least one embodiment, the phase inversion module 730 may be configured to receive one or more variable wave forms, identify latency between the variable wave forms, and reduce the latency using one or more algorithms that introduce a time shift to one of the variable wave forms or line up the peaks and valleys using the frequencies and amplitudes of the variable wave forms. The phase inversion module 730 may maintain one or more thresholds which can be used to determine whether the latency between the variable wave forms has been reduced to a point where phase inversion will help identify particular audio signals or wave forms in a merged variable wave form. The phase inversion module 730 may be configured to invert a modified variable wave form or one of the received variable wave forms by multiplying it by a negative value such as −1. The variable wave forms may be merged and an algorithm for identifying particular audio signals or wave forms which correlate to voice commands or wake words may be utilized to cease playback of content such as audio content from user device 704. In response to identifying a wake word or voice command, the user device and/or service provider computers 714 may generate and execute instructions that correspond to the wake word or voice command (e.g., "raise the volume of this song").

The architecture 700 may also include one or more service provider computers 714 that may, in some examples, provide computing resources such as, but not limited to, client entities, low latency data storage, durable data store, data access, management, virtualization, hosted computing environment or "cloud-based" solutions, electronic content performance management, media streaming services, content generation, etc. The service provider computers 714 may implement or be an example of the service provider computer(s) described herein and throughout the disclosure. The one or more service provider computers 714 may also be operable to provide site hosting, media streaming services, computer application development, and/or implementation platforms, combinations of the foregoing, or the like to the one or more users 702 via user devices 704.

In some examples, the networks 708 may include any one or a combination of many different types of networks, such as cable networks, the Internet, wireless networks, cellular networks, and other private and/or public networks. While the illustrated examples represents the users 702 communicating with the service provider computers 714 over the networks 708, the described techniques may equally apply in instances where the users 702 interact with the one or more service provider computers 714 via the one or more user devices 704 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 714 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 714 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 714 may be in communication with the user device 704 via the networks 708, or via other network connections. The one or more service provider computers 714 may include one or more servers, perhaps arranged in a cluster or as individual servers not associated with one another.

In one illustrative configuration, the one or more service provider computers 714 may include at least one memory 716 and one or more processing units or processor(s) 718. The processor(s) 718 may be implemented as appropriate in hardware, computer-executable instructions, firmware, or combination thereof. Computer-executable instruction or firmware implementations of the processor(s) 718 may include computer-executable or machine-executable instructions written in any suitable programming language to perform the various functions described when executed by a hardware computing device, such as a processor. The memory 716 may store program instructions that are loadable and executable on the processor(s) 718, as well as data generated during the execution of these programs. Depending on the configuration and type of the one or more service provider computers 714, the memory 716 may be volatile (such as RAM) and/or non-volatile (such as ROM, flash memory, etc.). The one or more service provider computers 714 or servers may also include additional storage 720, which may include removable storage and/or non-removable storage. The additional storage 720 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 716 may include multiple different types of memory, such as SRAM, DRAM, or ROM.

The memory 716, the additional storage 720, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 716 and the additional storage 720 are all examples of non-transitory computer storage media. Additional types of non-transitory computer storage media that may be present in the one or more service provider computers 714 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 714. Combinations of any of the above should also be included within the scope of non-transitory computer-readable media.

The one or more service provider computers 714 may also contain communication connection interface(s) 722 that allow the one or more service provider computers 714 to communicate with a data store, another computing device or server, user terminals, and/or other devices on the networks 708. The one or more service provider computers 714 may also include I/O device(s) 724, such as a keyboard, a mouse, a pen, a voice input device, a touch input device, a display, speakers, a printer, etc.

Turning to the contents of the memory 716 in more detail, the memory 716 may include an operating system 726, one or more data stores 728, and/or one or more application programs or services for implementing the features disclosed herein including the phase inversion module 730. In accordance with at least one embodiment, the phase inversion module 730 may be configured to receive one or more variable wave forms, identify latency between the variable wave forms, and reduce the latency using one or more algorithms that introduce a time shift to one of the variable wave forms or line up the peaks and valleys using the frequencies and amplitudes of the variable wave forms. The phase inversion module 730 may maintain one or more thresholds which can be used to determine whether the latency between the variable wave forms has been reduced to a point where phase inversion will help identify particular audio signals or wave forms in a merged variable wave form. The phase inversion module 730 may be configured to invert a modified variable wave form or one of the received variable wave forms by multiplying it by a negative value such as −1. The variable wave forms may be merged and an algorithm for identifying particular audio signals or wave forms which correlate to voice commands or wake words may be utilized to cease playback of content such as audio content from user device 704. In response to identifying a wake word or voice command, the user device and/or service provider computers 714 may generate and execute instructions that correspond to the wake word or voice command (e.g., "raise the volume of this song").

Figure 8:
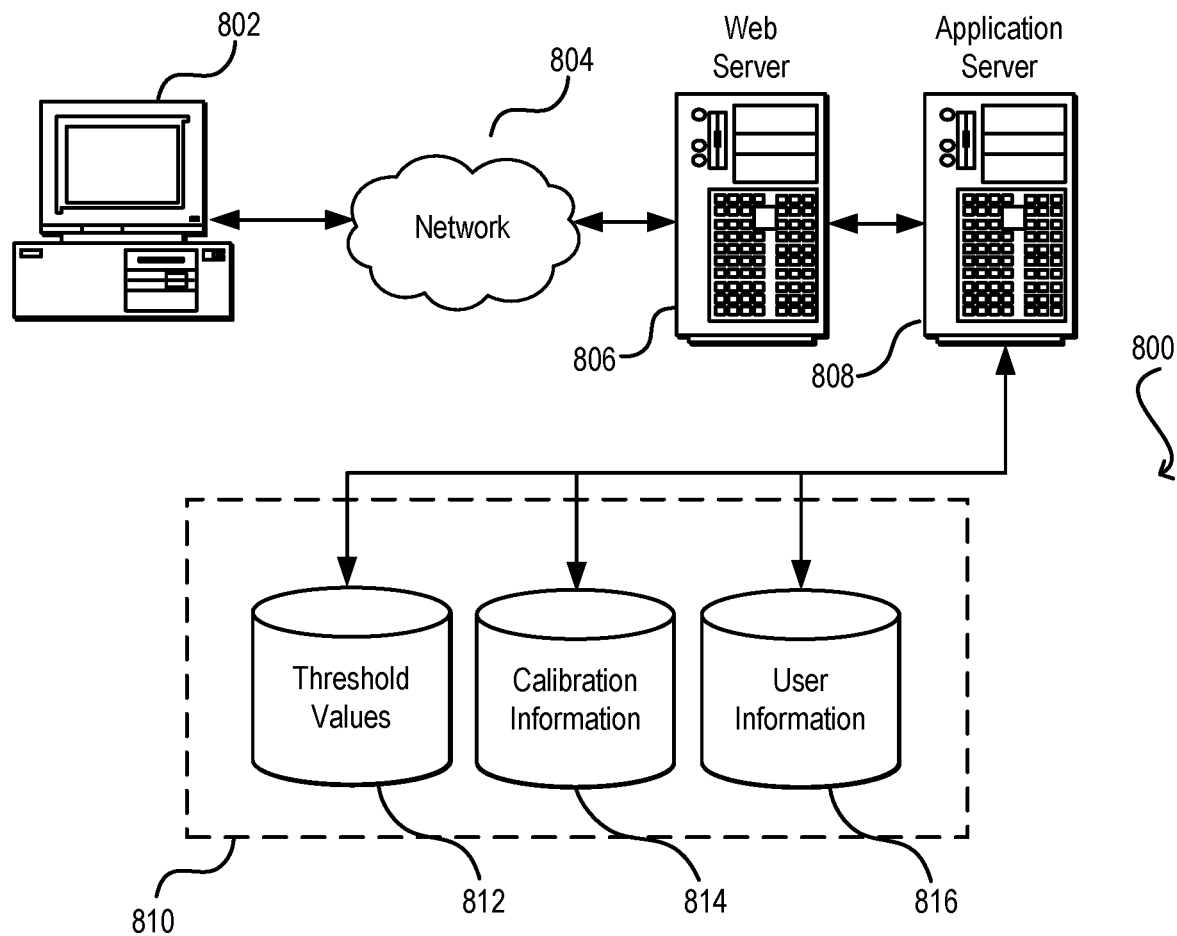
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing threshold values 812 and user information 816, which can be used to serve content for the production side, determine whether latency values are within tolerance or a tolerated variance so that when a wave form is inverted the wake word audio signal or wave form can more easily be identified in a content stream. The data store also is shown to include a mechanism for storing calibration information 814, which can be used for reporting, analysis, or other such purposes such as automatically adjusting any incoming audio file, wave form, or audio data by a certain time period. For example, an obtained, received, or recorded audio wave form may be shifted or adjusted by a time period that corresponds to the calibration information determined for a specific device or devices. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    outputting, by a computer device and an associated speaker, an audio file with a corresponding first variable wave form;
    receiving, by the computer device via an associated microphone, two wave forms, a first wave form corresponding to the first variable wave form, and a second wave form corresponding to a second variable wave form that includes the first variable wave form corresponding to the audio file and additional audio, the additional audio including audio that is different than the audio file;
    identifying, by the computer device, a latency value for the second variable wave form based at least in part on comparing at least one of amplitudes or frequencies of portions of the first variable wave form and the second variable wave form, wherein comparing the amplitudes or frequencies includes applying time modifications to the second variable wave form to reduce differences between the amplitudes and frequencies between the first variable wave form and the second variable wave form;
    modifying, by the computer device, the second variable wave form by applying the latency value and inverting the second variable wave form;
    merging, by the computer device, the first variable wave form and the modified second variable wave form to generate a merged variable wave form;
    identifying, by the computer device, a particular audio signal in the merged variable wave form; and
    in response to identifying the particular audio signal:
        performing an operation based at least in part on the particular audio signal identified in the merged variable wave form.

2. The computer-implemented method of claim 1, further comprising:
    identifying, by the computer device, that the second variable wave form corresponds to monoaural sound; and
    modifying, by the computer device, the first variable wave form from stereophonic to monoaural.

3. The computer-implemented method of claim 1, further comprising identifying, by the computer device, a voice command in the particular audio signal.

4. The computer-implemented method of claim 1, wherein modifying the second variable wave form further includes applying the latency value and aligning the amplitudes of the first variable wave form and the second variable wave form.

5. A non-transitory computer-readable storage medium storing computer-executable instructions that, when executed by a computer system, configure the computer system to perform operations comprising:

executing playback of an audio file with a corresponding first variable wave form;

receiving a second variable wave form that includes the first variable wave form and additional audio, the additional audio including audio that is different than the audio file;

identifying a latency value for the second variable wave form based at least in part on comparing at least one of amplitudes or frequencies of portions of the first variable wave form and the second variable wave form, wherein comparing the amplitudes or frequencies includes applying time modifications to the second variable wave form to reduce differences between the amplitudes and frequencies between the first variable wave form and the second variable wave form;

modifying the second variable wave form by applying the latency value and inverting the second variable wave form;

merging the first variable wave form and the modified second variable wave form to generate a merged variable wave form; and identifying a particular audio signal in the merged variable wave form.

6. The non-transitory computer-readable storage medium of claim 5, wherein identifying the particular audio signal includes comparing the merged variable wave form including the particular audio signal with a library of variable wave forms.

7. The non-transitory computer-readable storage medium of claim 5, wherein the merged variable wave form comprises a reduced volume version of the audio file and the additional audio.

8. The non-transitory computer-readable storage medium of claim 5, wherein the operations further comprise executing an action that corresponds to a voice command associated with the particular audio signal.

9. The non-transitory computer-readable storage medium of claim 5, wherein modifying the second variable wave form by applying the latency value comprises lining up the amplitudes of the first variable wave form and the second variable wave form.

10. The non-transitory computer-readable storage medium of claim 5, wherein the operations further comprise generating an audio query to verify a voice command associated with the particular audio signal in the merged variable wave form.

11. The non-transitory computer-readable storage medium of claim 5, wherein the operations further comprise:

ceasing playback of the audio file in response to identifying the particular audio signal in the merged variable wave form; and resuming playback of the audio file after a certain time period.

12. A computer system comprising:

a memory configured to store computer-executable instructions; and a processor in communication with the memory configured to execute the computer-executable instructions to at least:

maintain an audio file with a corresponding first variable wave form;

receive a second variable wave form that includes the first variable wave form and additional audio, the additional audio including audio that is different than the audio file;

identify a latency value for the second variable wave form based at least in part on comparing at least one of amplitudes or frequencies of portions of the first variable wave form and the second variable wave form, wherein comparing the amplitudes or frequencies includes applying time modifications to the second variable wave form to reduce differences between the amplitudes and frequencies between the first variable wave form and the second variable wave form;

modify the second variable wave form by applying the latency value and inverting the second variable wave form;

merge the first variable wave form and the modified second variable wave form; and identify a particular audio signal in the merged variable wave form.

13. The computer system of claim 12, wherein the latency value is a time period, and wherein modifying the second variable wave form includes shifting the second variable wave form by the time period.

14. The computer system of claim 12, wherein the processor is further configured to identify a default value for use as the latency value based at least in part on using a calibrated audio wave form.

15. The computer system of claim 14, wherein the processor is further configured to modify received audio automatically with the default value prior to inverting a corresponding wave form of the received audio.

16. The computer system of claim 12, wherein the processor is further configured to maintain one or more threshold values that corresponds to a minimum latency value for different types of audio.

17. The computer system of claim 16, wherein identifying the latency value is based at least in part on the latency value being below the one or more threshold values.

18. The computer system of claim 12, wherein the processor is further configured to stop playback of the audio file in response to identifying the particular audio signal.

* * * * *